United States Patent [19]
Lehmann

[11] Patent Number: 5,353,916
[45] Date of Patent: Oct. 11, 1994

[54] CONVEYER APPARATUS

[76] Inventor: Martin Lehmann, Obere Farnbühlstrasse 1, 5610 Wohlen, Switzerland

[21] Appl. No.: 31,869

[22] Filed: Mar. 16, 1993

[30] Foreign Application Priority Data

Mar. 16, 1992 [CH] Switzerland ............ 831/92-9

[51] Int. Cl.⁵ ............................................. B65G 47/31
[52] U.S. Cl. .................................. 198/461; 198/459
[58] Field of Search ................ 198/459, 461, 460

[56] References Cited

U.S. PATENT DOCUMENTS

| | | | |
|---|---|---|---|
| 1,160,791 | 11/1915 | Van Houten | 198/461 |
| 1,160,792 | 11/1915 | Van Houten | 198/461 |
| 2,015,187 | 9/1935 | Mayer | 198/459 |
| 3,470,668 | 10/1969 | Lindstrom et al. | 198/461 X |
| 3,901,375 | 8/1975 | Raque | 198/461 |
| 4,325,477 | 4/1982 | Heikinheimo | 198/461 |

FOREIGN PATENT DOCUMENTS

| | | | |
|---|---|---|---|
| 0056946 | 8/1982 | European Pat. Off. | 198/461 |
| 0044471 | 3/1980 | Japan | 198/461 |
| 0113063 | 7/1984 | Japan | 198/461 |
| 0163220 | 9/1984 | Japan | 198/461 |

Primary Examiner—James R. Bidwell
Attorney, Agent, or Firm—Antonelli, Terry, Stout & Kraus

[57] ABSTRACT

The conveyer apparatus includes a conveying path which is divided into two directly subsequent path sections, namely an inflow path section and an outflow path section. Each path section includes an endless conveyer belt and the belts are provided with conveying members for the articles to be conveyed. The running speed of the inflow belt is lower than the running speed of the outflow belt, such that at the transfer of the articles from the inflow section to the outflow section the articles are spatially separated.

10 Claims, 2 Drawing Sheets

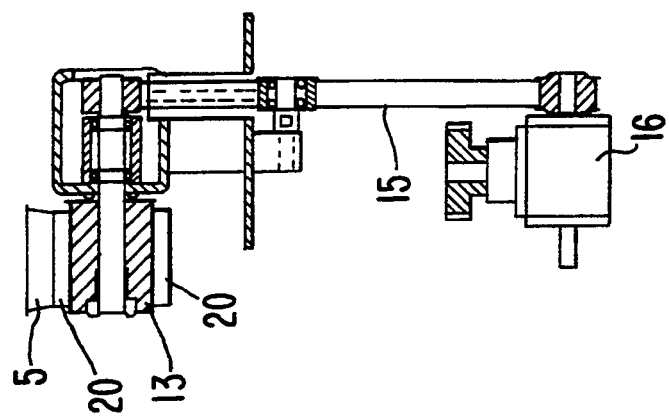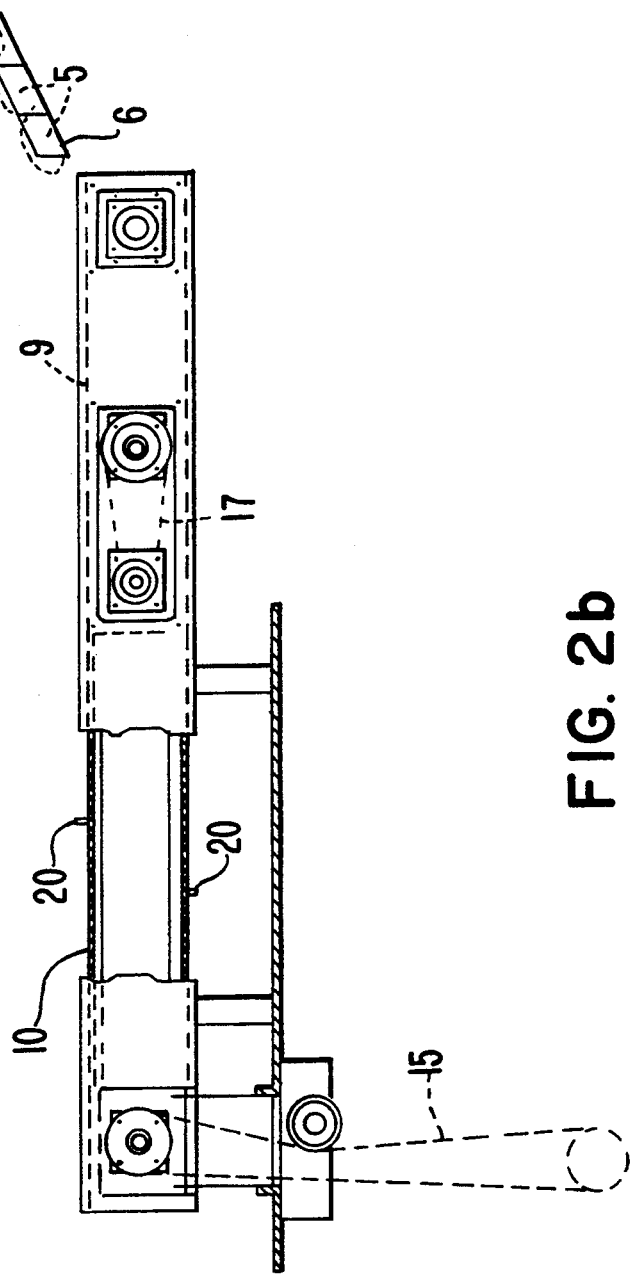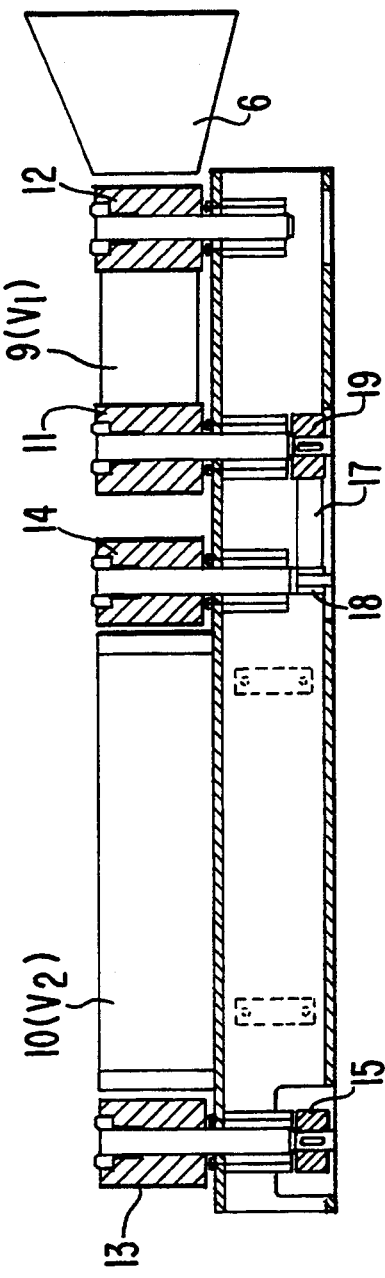

CONVEYER APPARATUS

BACKGROUND OF THE INVENTION

1. Field of the Invention

The present invention relates to a conveyer apparatus for a plurality of individual articles, having a means for spatially separating of the articles to be conveyed along a conveying path of the conveyer apparatus. Such conveyer apparatuses are used predominantly to feed single articles, such as, for example, packages containing foodstuff, individually to a processing or testing apparatus, for example, to individual operating stations.

2. Description of the Prior Art

Earlier conveyer apparatuses have been used predominantly to feed bottles containing a filled in ware to a leakage testing apparatus. Such articles, for example, bottles have precise outer diameters and are generally not deformable. Because these articles arrive at the conveying path in a state closely following each other closely, an apparatus for a spatially separating (separator) of the articles must be foreseen because the articles must be conveyed to processing stations which are arranged at predetermined distances from each other (for example, a revolving processing apparatus). The apparatus for spatially separating the articles has been a screw conveyer having a pitch which increases in the direction of transport and which engages the articles laterally and separates the articles from each other.

It now has been recognized that such an apparatus for spatially separating articles, specifically packages made of a soft plastic material and similar is not suitable because the outer shape of such packages does generally not feature the necessary stability.

SUMMARY OF THE INVENTION

Therefore, it is a general object of the present invention to provide an apparatus of the type set forth above which is suitable for a conveying and separating of arbitrary articles, also such which have a non-cylindrical shape and possibly varying outer contours.

A further object is to provide a conveyer apparatus having a conveying path which includes an inflow path section and a directly subsequent outflow path section, with each path section being an independent conveyer device having an endless conveyer belt, and with each of the conveyer belts including conveying members for the articles to be conveyed, whereby a running speed of the conveyer belt of the inflow path section is less than a running speed of the outflow path section, such that, upon the transfer of the articles being conveyed from the inflow path section to the outflow path section, a spatial separation of the articles is produced which follow each other closely on the inflow path section.

BRIEF DESCRIPTION OF THE DRAWINGS

The invention will be better understood and objects other than those set forth above will become apparent when consideration is given to the following detailed description thereof when taken in connection with the accompanying drawing wherein:

FIGS. 2a–2c are schematic partial cross sectional views of the conveyor apparatus of FIG. 1.

DESCRIPTION OF THE PREFERRED EMBODIMENT

Figure 1:
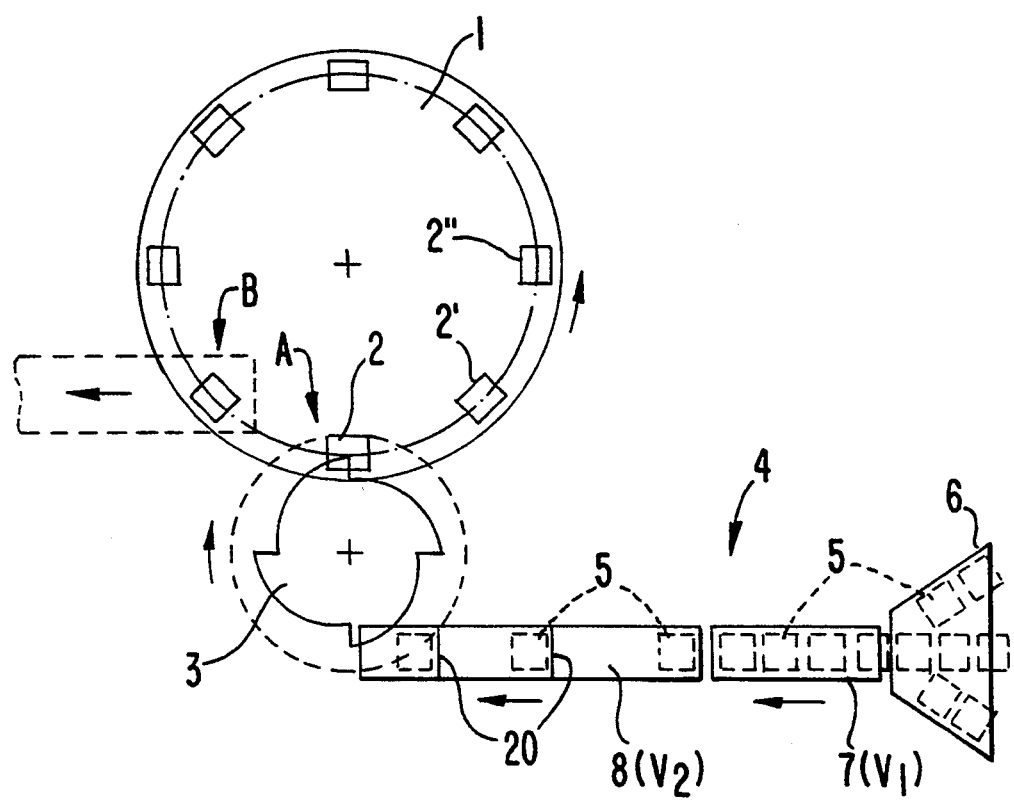
FIG. 1 schematically illustrates a testing station in the form of a revolving turret and a conveyor apparatus associated therewith constructed in accordance with the present invention.

FIG. 1 of the drawing illustrates on a schematic basis only a testing apparatus 1 designed as revolving turret having operating stations 2, 2', 2" which rotate continuously from the receiving station A to the delivery station B. Such machines, in which, for example, leakage tests of articles (packagings) are made in the operating stations are known and do not form part of the invention. The testing proceeds during the rotating of the revolving turret from the receiving station A to the delivery station B.

The articles are withdrawn from a conveying path 4 by a star-shaped feeding device 3, and are fed one after the other to respective receiving stations The feeding devices 3 and their arrangement relative to the revolving turret are conventional.

It is quite obvious that the speeds of rotation of the revolving turret 1 and of the feeding device 3 must match each other in such a manner that always one single article is delivered into one respective operating station. If the revolving turret 1 and the feeding device 3 have the same speed at their operative "pitch circles" the distances between the operating stations 2 are equal to those between the stations at the feeding device 3. If the distances between the stations of the revolving turret and between the stations of the star are not the same, the rotational speeds must be made to match each other accordingly.

The articles 5 to be conveyed, here vacuum foodstuff packages, are fed to the conveying path 4 via a feeding device 6 (e.g. incline) in a tightly abutting manner.

The object is now to spatially separate the articles to be conveyed along the conveying path 4 in such a manner that they are individually engaged and passed on by the conveyer members of the feeding device 3.

For this reason the inventive conveying path 4 comprises two conveying path sections, namely, an inflow conveying path section 7 and an outflow or discharge conveying path section 8, whereby the speed of advance of the inflow conveying path section 7 is less than that of the outflow conveying path section 8. Thus, the articles are spatially separated such that, at a transition between the inflow conveying path section 7 and the outflow conveying path section 8, the articles are fed in the necessary time intervals one after the other to the feeding device 3.

The conveyer apparatus 4 is illustrated in detail in FIGS. 2a–2c. Every conveying path section 7 and 8, respectively includes an endless conveyer belt 9 and 10 which conveyer belts respectively run over supporting rollers 11, 12 and 13, 14.

The roller 13 is driven by a motor via a toothed belt 15 (or via a gearing 16 in synchronism and by the drive of the revolving turret 1 and feeding device 3).

The roller 14 is driven via the conveyer belt 10, from which roller 14 the roller 11 of the conveyer belt 9 is driven via a toothed belt 17. The drive between the conveyer belt 10 and the conveyer belt 9 proceeds via a speed reduction 18, 19 in such a manner that the speed of the conveyor belt 9 is lower than the speed of the belt 10.

The design of this conveyer apparatus having a separating device is extremely simple and precise. Conveying members 20 extending preferably perpendicularly to the belts, are seen on the conveyer belts 9, 10 which members 20 keep the articles 5 to be conveyed securely at a distance from each other.

In the illustrated example the running speed $V_1$ of the inflow belt 9 corresponds to the number of packages to be treated per minute. The higher running speed $V_2$ of the outflow belt 10 corresponds to the speed of the revolving turret 1 (on the divided circle of the operating stations) and of the star feeding device 3 (on the divided circle of the conveying members of the star feeding device). The drives of the revolving turret 1, the star feeding device 3 and of the conveyer belts 9, 10 are synchronized (gearing). The conveyer members 20 on the belt 10 are arranged at mutual distances from each other which correspond to the distances between the conveying members of the star feeding device 3.

While there is shown and described a present preferred embodiment of the invention, it is to be distinctly understood that the invention is not limited thereto but may be otherwise variously embodied and practiced within the scope of the following claims.

I claim:

1. A conveyor apparatus for a plurality of individual articles, the conveyer apparatus including a means for spatially separating the articles being conveyed along a conveying path of the conveyer apparatus, said conveying path comprising an inflow path section and a directly subsequent outflow path section disposed in substantially a common horizontal plane, wherein each path section includes an independent conveyor device having an endless article supporting conveyor belt, each of the conveyer belts include conveying members extending transversely of the respective conveyer belts for facilitating conveying of the respective articles, whereby a running speed of the conveyor belt of the inflow path section is less than a running speed of the outflow path section, such that, upon the transfer of the articles being conveyed from the inflow path section to the outflow path section, a spatial separation of the articles is produced which closely follow each other on the inflow path section.

2. A conveyor apparatus according to claim 1, wherein the conveyor belts are driven by a common drive.

3. A conveyor apparatus according to claim 2, wherein means are provided for drivingly connecting said conveyer belts to each other.

4. A conveyer apparatus according to claim 2, wherein said means for driving the connecting comprises toothed belts.

5. A conveyor apparatus according to claim 1, further comprising a driving motor drivingly connected to the conveyor belt of the outflow path section; and a means for drivingly connecting the conveyor belts.

6. A conveyor apparatus according to claim 1, wherein the apparatus is constructed for conveying and spatially separating articles of a plastic material.

7. A conveyor apparatus according to claim 6, wherein the articles are soft packages containing vacuum sealed foodstuff.

8. A conveyor apparatus for conveying a plurality of articles between an article feeding structure and a star-shaped transferring apparatus adapted to pass individual articles to a processing apparatus, said conveying path comprising an inflow path section and a directly subsequent outflow path section, each path section including a conveyor deice having an endless conveyor belt, wherein each of said conveyer belts include conveying members extending transversely to the respective conveyor belts for facilitating the conveyance of the respective articles, and wherein a running speed of the conveyor belt of the inflow path section is less than a running speed of the outflow path section, such that, upon the transfer of the articles being conveyed from the inflow path section to the outflow path section, a spatial separation of the articles is produced which closely follow each other on the inflow path section.

9. A conveyer apparatus according to claim 8, wherein said processing apparatus includes a multiple station testing apparatus in the form of a revolving turret.

10. A conveyor apparatus according to claim 8, wherein the processing apparatus includes a leakage testing apparatus for such articles.

* * * * *